United States Patent
Ha et al.

(10) Patent No.: US 6,704,081 B2
(45) Date of Patent: Mar. 9, 2004

(54) TRANSFLECTIVE LIQUID CRYSTAL DISPLAY DEVICE HAVING REFLECTOR COVERING SIDES OF TRANSMISSIVE REGION ASYMMETRICALLY AND METHOD OF MANUFACTURING THE SAME

(75) Inventors: Kyoung-Su Ha, Seoul (KR); Heum-Il Baek, Seoul (KR); Dong-Guk Kim, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/260,542

(22) Filed: Oct. 1, 2002

(65) Prior Publication Data

US 2003/0160920 A1 Aug. 28, 2003

(30) Foreign Application Priority Data

Feb. 27, 2002 (KR) .................................. 2002-10657

(51) Int. Cl.[7] ............................................. G02F 1/1343
(52) U.S. Cl. ....................................... 349/114; 349/113
(58) Field of Search ................................... 349/113, 114

(56) References Cited

U.S. PATENT DOCUMENTS

| | | | | |
|---|---|---|---|---|
| 5,345,324 A | * | 9/1994 | Koseki et al. ................. 349/44 |
| 5,459,596 A | * | 10/1995 | Ueda et al. .................... 349/39 |
| 6,603,524 B1 | * | 8/2003 | Shimada et al. ............. 349/139 |
| 2002/0109811 A1 | * | 8/2002 | Park et al. ................... 349/113 |
| 2002/0176040 A1 | * | 11/2002 | Lim et al. .................... 349/113 |

* cited by examiner

*Primary Examiner*—Robert H. Kim
*Assistant Examiner*—Andrew Schechter
(74) *Attorney, Agent, or Firm*—McKenna, Long & Aldridge, LLP

(57) ABSTRACT

A transflective liquid crystal display device includes a gate line and a data line on a first substrate that cross each other to define a pixel region having a transmissive region and a reflective region. A first passivation layer covers a thin film transistor which is electrically connected to the gate and data lines, wherein the first passivation layer has a first transmissive hole corresponding to the transmissive region and an inclined portion surrounding the first transmissive hole. A reflector is on the first passivation layer, wherein the reflector corresponds to the reflective region and covers sides of the transmissive region asymmetrically. A second passivation layer is on the reflector. A transparent electrode is on the second passivation layer, wherein the transparent electrode electrically contacts the thin film transistor.

25 Claims, 15 Drawing Sheets

White display

Black display

TRANSFLECTIVE LIQUID CRYSTAL DISPLAY DEVICE HAVING REFLECTOR COVERING SIDES OF TRANSMISSIVE REGION ASYMMETRICALLY AND METHOD OF MANUFACTURING THE SAME

This application claims the benefit of Korean Patent Application No. 2002-10657, filed on Feb. 27, 2002 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a transflective liquid crystal display (LCD) device and a method of manufacturing the same.

2. Discussion of the Related Art

In general, the liquid crystal display (LCD) device includes two substrates, which are spaced apart and facing each other, and a liquid crystal layer interposed between the two substrates. Each of the substrates includes an electrode and the electrodes of each substrate are also facing each other. Voltage is applied to each electrode and an electric field is induced between the electrodes. An alignment of the liquid crystal molecules is changed by varying the intensity of the electric field. The LCD device displays a picture by varying transmittance of the light according to the arrangement of the liquid crystal molecules.

Because the liquid crystal display (LCD) device is not luminescent, it needs an additional light source in order to display images. The liquid crystal display device is categorized into a transmissive type and a reflective type depending on the type of light source.

In the transmissive type, a backlight is used as a light source behind a liquid crystal panel. Light incident from the backlight penetrates the liquid crystal panel, and the amount of the transmitted light is controlled depending on the alignment of the liquid crystal molecules. Here, the substrates are usually transparent and the electrodes of each substrate are usually formed of transparent conductive material. As the transmissive liquid crystal display (LCD) device uses the backlight as a light source, it can display a bright image in dark surroundings. Because an amount of the transmitted light is very small for the light incident from the backlight, the brightness of the backlight must be increased in order to increase the brightness of the LCD device. Consequently, the transmissive liquid crystal display (LCD) device has high power consumption due to the operation of the backlight.

On the other hand, in the reflective type LCD device, sunlight or artificial light is used as a light source of the LCD device. The light incident from the outside is reflected at a reflective plate of the LCD device according to the arrangement of the liquid crystal molecules. Since there is no backlight, the reflective type LCD device has much lower power consumption than the transmissive type LCD device. However, the reflective type LCD device cannot be used in dark surroundings because it depends on an external light source.

Therefore, a transflective LCD device, which can be used both in a transmissive mode and in a reflective mode, has been recently proposed. A conventional transflective LCD device will be described hereinafter more in detail.

FIG. 1 is an exploded perspective view illustrating a conventional transflective LCD device. The conventional transflective LCD device 11 has upper and lower substrates 15 and 21, which are spaced apart from and facing each other, and also has a liquid crystal layer 14 interposed between the upper substrate 15 and the lower substrate 21.

A gate line 25 and a data line 39 are formed on the inner surface of the lower substrate 21. The gate line 25 and the data line 39 cross each other to define a pixel area "P". The pixel area "P" includes a transmissive region "B" and a reflective region "A". A thin film transistor "T" is situated at the crossing of the gate line 25 and the data line 39. A reflective electrode 49 having a transmissive hole 49a and a transparent electrode 61 overlapping the reflective electrode 49 are formed in the pixel area "P". The reflective electrode 49 and/or the transparent electrode 61 are connected to the thin film transistor "T". The transmissive hole 49a corresponds to the transmissive region "B".

Meanwhile, a black matrix 16, which has an opening corresponding to the reflective electrode 49 and the transparent electrode 61, is formed on the inside of the upper substrate 15, and a color filter 17 corresponding to the opening of the black matrix 16 is formed on the black matrix 16. The color filter 17 is composed of three colors: red (R), green (G) and blue (B). Each color corresponds to each pixel area "P". Subsequently, a common electrode 13 is formed on the color filter 17.

FIG. 2 is a schematic cross-sectional view of a conventional transflective LCD device. FIG. 2 indicates a pixel area of the conventional transflective LCD device. In the conventional transflective LCD device 11, a reflective electrode 49 is formed on the inner surface of a lower substrate 21 and an insulating layer 50 is formed on the reflective electrode 49. The reflective electrode 49 has a transmissive hole 49a corresponding to a transmissive region "B". A transparent electrode 61 is formed on the insulating layer 50. As stated above, the lower substrate 21 includes a gate line (not shown), a data line (not shown) and a transistor (not shown) thereon.

An upper substrate 15 is spaced apart from and facing the lower substrate 21. A common electrode 13 is formed on the inner surface of the upper substrate 15. Though not shown in the figure, a black matrix and a color filter are subsequently formed between the upper substrate 15 and the common electrode 13.

A liquid crystal layer 14 is disposed between the lower and upper substrates 21 and 15, and molecules of the liquid crystal layer 14 are arranged horizontally with respect to the substrates 21 and 15.

Polarizers (not shown) are arranged on the outer surface of the lower and upper substrate 21 and 15. The transmission axes of polarizers are perpendicular to each other.

A backlight 41 is located under the outside of the lower substrate 21. The backlight 41 is used as a light source of a transmissive mode of the transflective LCD device.

In a transmissive mode, the first light "F1" from the back light 41 penetrates the transparent electrode 61 in the transmissive region "B". Next, while the first light "F1" passes through the liquid crystal layer 14, the amount of the first light "F1" is controlled by the arrangement of the liquid crystal layer depending on applied voltage. Then the first light "F1" is emitted.

On the other hand, in a reflective mode, the second light "F2" incident from the outside such as sunlight or artificial light passes through the liquid crystal layer 14 and is reflected at the reflective electrode 49 in a reflective region "A". The second light "F2" goes through the liquid crystal layer 14 again and is emitted. At this time, the amount of emitted second light "F2" is controlled according the arrangement of liquid crystal molecules.

Because of different optical paths of the first and second lights "F1" and "F2", the polarizing properties of the emitted lights are different from each other. That is, the first light "F1" passes through the liquid crystal layer only once while the second light "F2" passes through the liquid crystal layer twice. Therefore, the transmittance is different in the transmissive mode and in the reflective mode as the cell gap is uniform, and it is difficult to realize high definition.

Recently, transflective LCD devices that simultaneously optimize the transmittance of a transmissive mode with the brightness of a reflective mode have been proposed. These transflective LCD devices are described with reference to the attached figures.

FIG. 3 is a plan view showing an array substrate for a transflective liquid crystal display (LCD) device according to a first embodiment of the related art. In FIG. 3, a gate line 25 is formed horizontally in the context of the figure and a data line 39 is formed vertically in the context of the figure. The gate and data lines 25 and 39 cross each other to define a pixel region "P", which includes a transmissive region "B" and a reflective region "A". At the crossing of the gate and data lines 25 and 39, a thin film transistor "T" is formed and the thin film transistor "T" is electrically connected to the gate and data lines 25 and 39. A transparent electrode 61 and a reflector 49 are formed in the pixel region "P". The transparent electrode 61 is a pixel electrode of the array substrate and is connected to the thin film transistor "T". The reflector 49 may be a reflective electrode when the reflector 49 is electrically connected to the thin film transistor "T". Meanwhile, a first passivation layer (not shown) is formed under the reflector 49 and the first passivation layer has a first transmissive hole 27 corresponding to the transmissive region "B". The first transmissive hole 27 is to optimize the transmittance of a transmissive mode with the transmittance or optical efficiency of a reflective mode. An inclined portion 27a surrounds the first transmissive hole 27 and is covered with the reflector 49. The reflector 49 also has a second transmissive hole 49a corresponding to the first transmissive hole 27.

An arrow "G1" shows an alignment direction of an alignment layer (not shown) to be formed on the top of the array substrate.

FIG. 4 is a cross-sectional view along the line IV—IV of FIG. 3. In FIG. 4, a gate insulator 22 and a first passivation layer 23 subsequently are formed on a substrate 21. A reflector 49 is formed on the first passivation layer 23. The first passivation layer 23 has a first transmissive hole 27 corresponding to a transmissive region "B" and also the reflector 49 has a second transmissive hole 49a. An inclined portion 27a is formed around the first transmissive hole 27.

A second passivation layer 28 is formed on the reflector 49 and a transparent electrode 61 is formed on the second passivation layer 28. An alignment layer 63 is formed on the transparent electrode 61 and the surface of the alignment layer 63 is arranged in a direction of the arrow "G1" of FIG. 3 by a rubbing method. Though not shown in the figure, a thin film transistor is formed on the substrate 21.

Since the first transmissive hole 27 makes a liquid crystal layer (not shown) of the transmissive region "B" about two times the thickness of that of the reflective region "A", the optical characteristic of the transmissive mode is optimized with the optical characteristic of the reflective mode.

However, as stated above, the inclined portion 27a is formed between the transmissive region "B" and the reflective region "A", and the thickness of the liquid crystal layer (not shown) disposed on the inclined portion 27a changes continuously. Accordingly, when the voltage is applied to the transflective LCD device, a fringe field is produced in the inclined portion 27a and a distortion occurs. Also, the phase difference of the liquid crystal layer varies in the region, and thus light leakage occurs. Therefore, the reflector 49 covers the inclined portion 27a in order to prevent light leakage.

However, when the alignment direction "G1" is about −45 degrees with respect to the gate line 25 of FIG. 3, the arrangement of the alignment layer is poor in a neighboring region "I" of the inclined portion 27a. Accordingly, light leakage occurs in the region "I" in the transmissive mode. The light leakage is shown in FIG. 5.

As shown in FIG. 5, the light leakage 50 occurs in the upper and left sides in the context of the figure (circled) of the transmissive region "B" of FIGS. 3 and 4, wherein the upper and left sides correspond to the neighboring region "I" of the inclined portion 27a of FIG. 4. During rubbing, the rubbing cloth may not reach the areas in region "I" due the −45° alignment direction shown in FIG. 3 and the arrangement of the alignment layer 63 of FIG. 4 is poor in the region "I". The light leakage 50 fairly lowers the contrast ratio of the transflective LCD device.

On the other hand, another structure of an array substrate for the transflective LCD device to block the light leakage is suggested in FIGS. 6 and 7. FIG. 6 is a plan view of showing an array substrate for a transflective liquid crystal display (LCD) device according to a second embodiment of the related art and FIG. 7 is a cross-sectional view along the line VII—VII of FIG. 6. Here, FIG. 6 shows only the pixel region "P," and the array substrate has the same structure as that of the related art first embodiment except for the reflector. The alignment direction of the array substrate of FIG. 6 is about −45 degrees with respect to a gate line (not shown), which is horizontal in the context of the figure.

In FIGS. 6 and 7, the reflector 49 extends into the inside of the transmissive region "B", covering the inclined portion 27a. Therefore, the light leakage in the region "I" is blocked.

As the region "I" does not belong to either the transmissive mode or the reflective mode, the aperture ratio decreases. Since a pixel pitch is very small in an LCD device having a high resolution, the aperture ratio is reduced.

SUMMARY OF THE INVENTION

Accordingly, the present invention is directed to an array substrate for a transflective liquid crystal display (LCD) device and a method of manufacturing the same that substantially obviates one or more of problems due to limitations and disadvantages of the related art.

An advantage of the present invention is to provide an array substrate for a transflective liquid crystal display (LCD) device that has high aperture ratio and high resolution and in which no light leakage occurs.

Another advantage of the present invention is to provide a method of manufacturing an array substrate for a transflective liquid crystal display (LCD) device that has high aperture ratio and high resolution and in which no light leakage occurs.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes a first substrate; a gate line and a data line on the first substrate, wherein the gate and data lines cross each other to define a pixel region having a transmissive region and a reflective region; a thin film transistor electrically connected to the gate and data lines; a first passivation layer covering the thin film transistor, wherein the first passivation layer has a first transmissive hole corresponding to the transmissive region and an inclined portion surrounding the first transmissive hole; a reflector on the first passivation layer covering sides of the transmissive region asymmetrically, wherein the reflector corresponds to the reflective region; a second passivation layer on the reflector; and a transparent electrode on the second passivation layer, wherein the transparent electrode electrically contacts the thin film transistor. The asymmetric location of the reflector on the sides of the transmissive region is determined by the alignment direction.

The transflective liquid crystal display device further includes a black matrix on a second substrate spaced apart over the array substrate. The black matrix overlaps the data line and covers at least a side of the inclined portion.

In another aspect, a method of manufacturing a transflective liquid crystal display device includes forming a gate line on a first substrate; forming a data line crossing the gate line, the data line and the gate line defining a pixel region, the pixel region having a transmissive region and a reflective region; forming a thin film transistor electrically connected to the gate and the data lines; forming a first passivation layer on the thin film transistor, wherein the first passivation layer has a first transmissive hole corresponding to the transmissive region and an inclined portion surrounding the first transmissive hole; forming a reflector corresponding to the reflective region on the first passivation layer covering sides of the transmissive region asymmetrically; forming a second passivation layer on the reflector; and forming a transparent electrode electrically contacting the thin film transistor on the second passivation layer. The asymmetric location of the reflector on the sides of the transmissive region is determined by the alignment direction.

The method of manufacturing the transflective liquid crystal display device further includes forming a black matrix on a second substrate spaced apart over the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
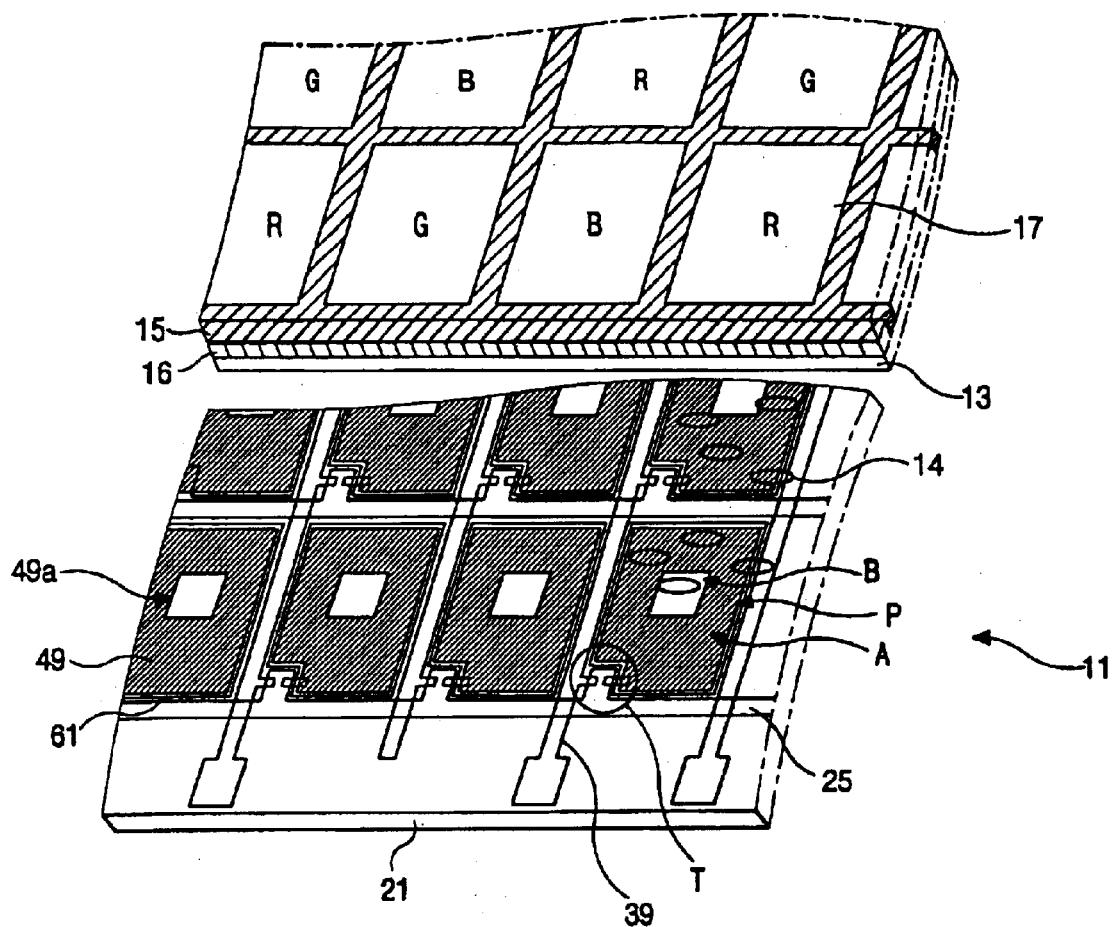
FIG. 1 is an exploded perspective view illustrating a conventional transflective LCD device.
Figure 2:
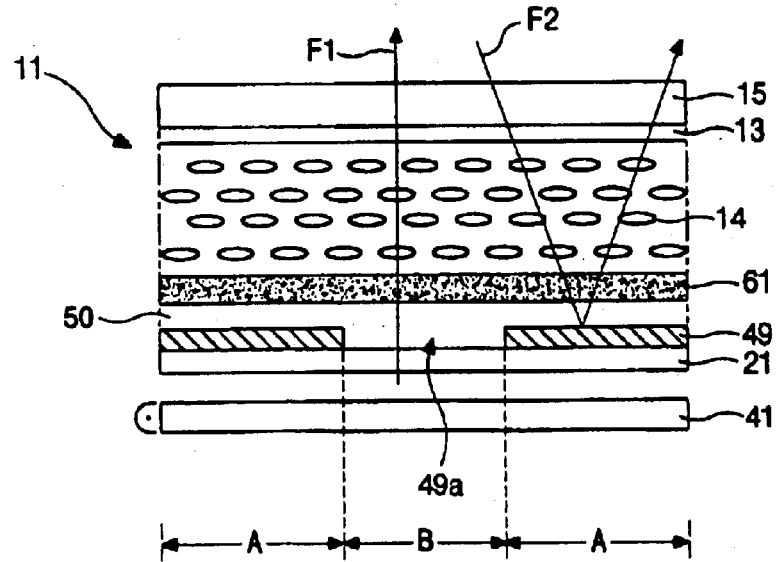
FIG. 2 is a schematic cross-sectional view of a conventional transflective LCD device.
Figure 3:
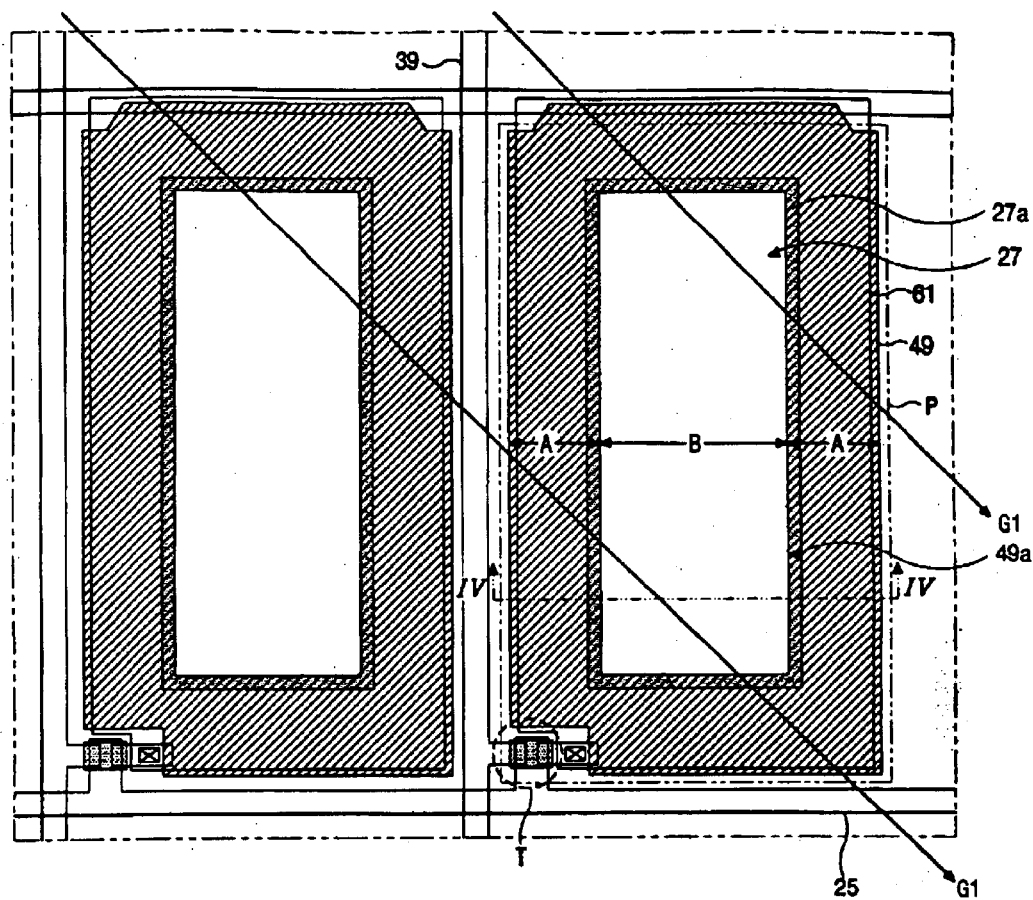
FIG. 3 is a plan view showing an array substrate for a transflective liquid crystal display (LCD) device according to a first embodiment of the related art.
Figure 4:
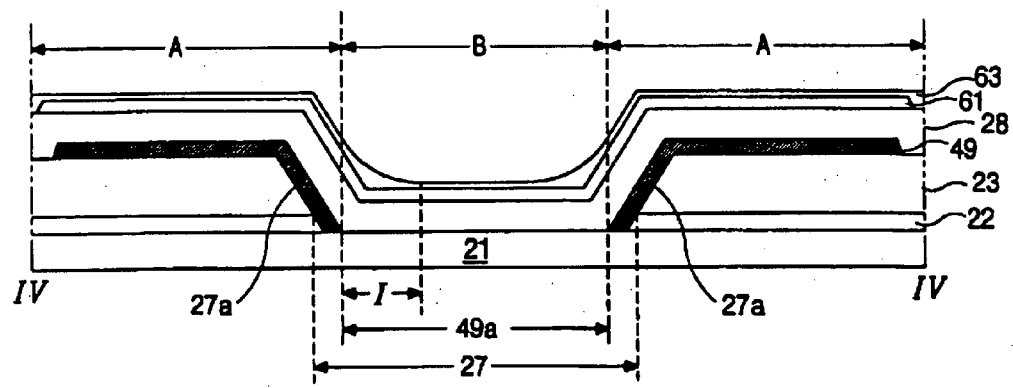
FIG. 4 is a cross-sectional view along the line IV—IV of FIG. 3.
Figure 5:
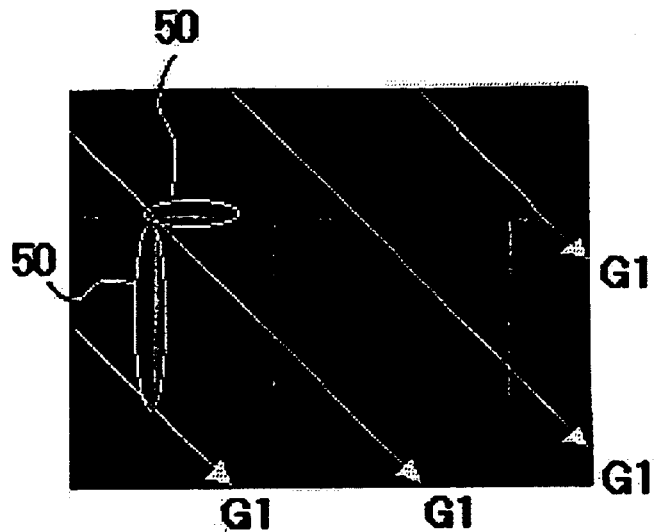
FIG. 5 is a view showing light leakage in a related art transflective liquid crystal display (LCD) device.
Figure 6:
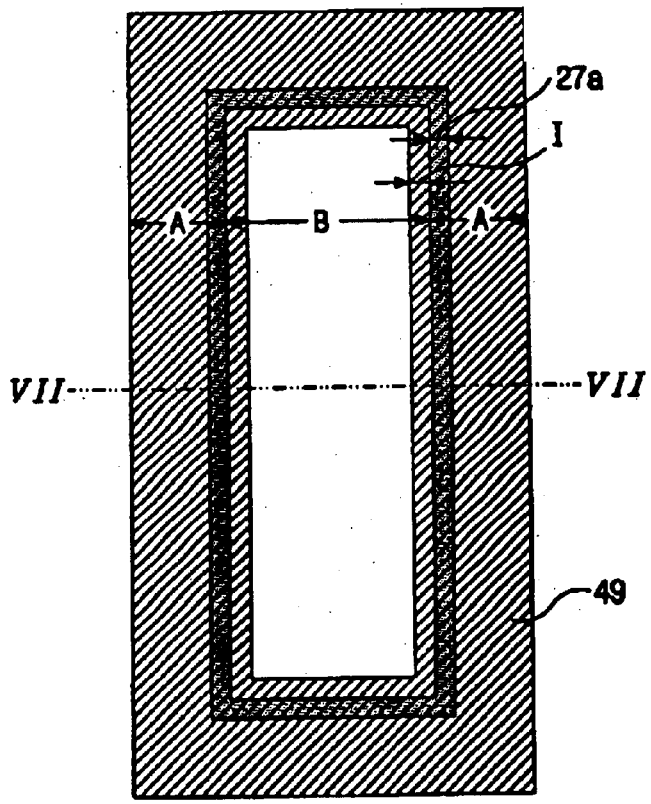
FIG. 6 is a plan view of showing an array substrate for a transflective liquid crystal display (LCD) device according to a second embodiment of the related art.
Figure 7:
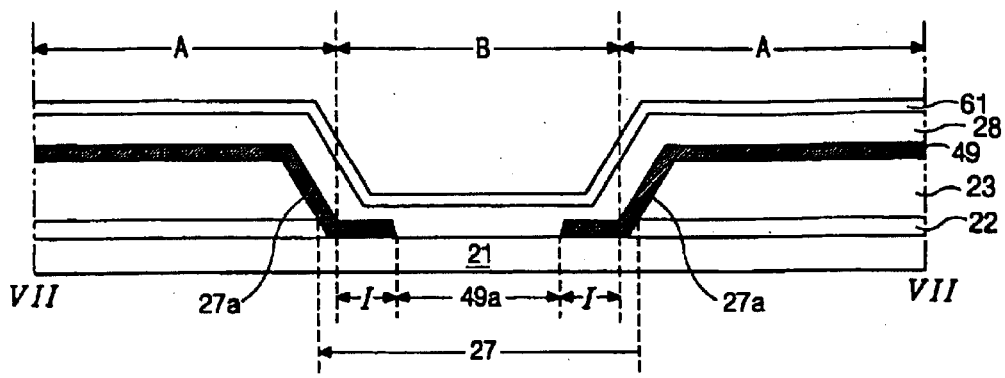
FIG. 7 is a cross-sectional view along the line VII—VII of FIG. 6.
Figure 8:
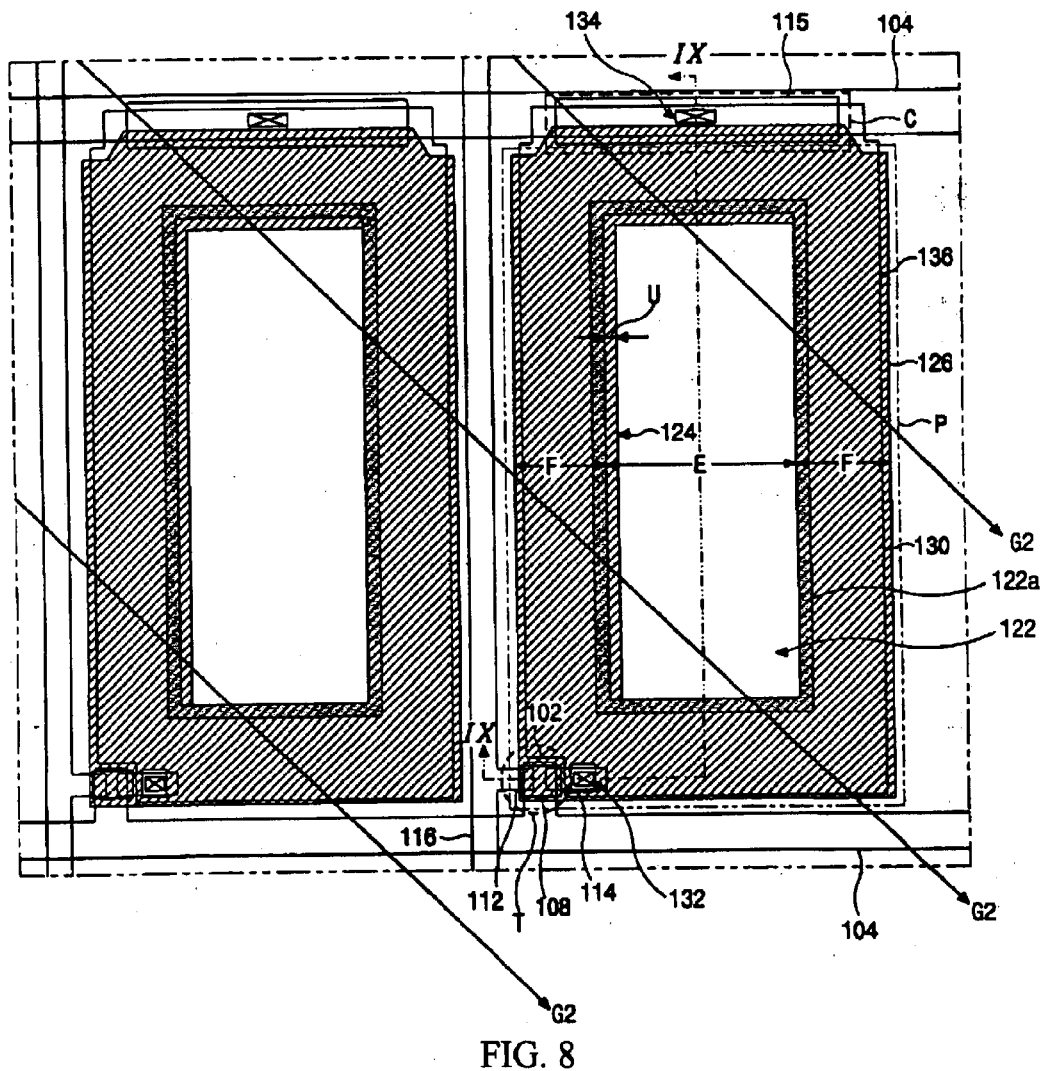
FIG. 8 is a plan view of an array substrate for a transflective liquid crystal display (LCD) device according to a first embodiment of the present invention.

FIG. 8 shows a plan view of an array substrate for a transflective liquid crystal display (LCD) device according to a first embodiment of the present invention.

As shown in FIG. 8, a gate line 104 is formed horizontally in the context of the figure and a gate electrode 102 is connected to the gate line 104. A data line 116 is formed vertically in the context of the figure and a source electrode 112 and a drain electrode 114 are formed. The source electrode 112 is connected to the data line 116. The gate and data lines 104 and 116 cross each other and define a pixel region "P". The gate electrode 104, the source electrode 112 and drain electrode 114 form a thin film transistor "T". The thin film transistor "T" includes an active layer 108.

The pixel region "P" is divided into a transmissive region "E" and a reflective region "F". In the pixel region "P", a reflector 126 and a transparent electrode 136 are formed. Meanwhile, a passivation layer (not shown), which may be referred to as a first passivation layer later, is formed under the reflector 126 and the transparent electrode 136. The passivation layer has a first transmissive hole 122 corresponding to the transmissive region "E". The first transmissive hole 122 has an inclined portion 122a that surrounds the first transmissive hole 122. The reflector 126 has a second transmissive hole 124 corresponding to the first transmissive hole 122. The reflector 126 also covers the inclined portion 122a and is formed in a region "U" inside of the transmissive region "E", wherein the region "U" corresponds to the upper and left sides of the transmissive region "E" in the context of the figure. The asymmetric location of the reflector on the sides of the transmissive region is determined by the alignment direction. Here, an alignment direction "G2" of an alignment layer (not shown) to be formed on the top of the array substrate is about −45 degrees with respect to the gate line 104. Though the region "U" may not be reached by a rubbing cloth used in a rubbing method, the light leakage is blocked in the region "U" by the reflector 126.

The transparent electrode 136 is a pixel electrode of driving liquid crystal molecules and is connected to the drain electrode 114 of the thin film transistor "T" through a drain contact hole 132. Although the reflector 126 is not connected to the thin film transistor "T", the reflector 126 may also be connected to the drain electrode 114. The reflector 126 may be referred to as a reflective electrode.

A capacitor electrode 115 is formed overlapping the gate line 104. The capacitor electrode 115 is connected to the transparent electrode 136 through a capacitor contact hole 134. The capacitor electrode 115 forms a storage capacitor "C" with the overlapped gate line 104. Alternatively, the capacitor electrode 115 can be connected to the drain electrode 114 which extends into the pixel region (not shown). In such a case, only one contact hole is required.

FIGS. 9A to 9D illustrate a method of manufacturing an array substrate for a transflective liquid crystal display (LCD) device according to the first embodiment of the present invention, and correspond to cross-sections along the line IX—IX of FIG. 8.

Figure 9A:
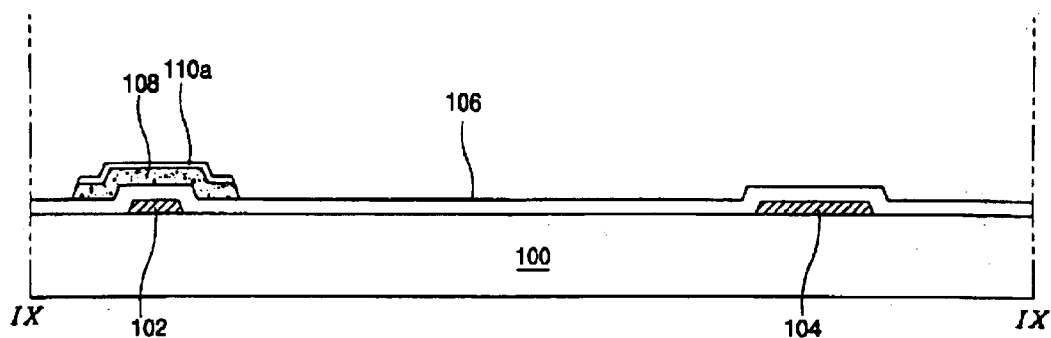
FIGS. 9A to 9D are cross-sectional views illustrating a method of manufacturing an array substrate for a transflective liquid crystal display (LCD) device according to the first embodiment of the present invention.

In FIG. 9A, a gate electrode 102 and a gate line 104 are formed on a substrate 100 and a gate insulator 106 is formed on the gate electrode 102 and the gate line 104. Next, an active layer 108 and a doped semiconductor layer 110a are formed on the gate insulator 106 in order. The substrate 100 is made of an insulating material such as glass. The gate electrode 102 is connected to the gate line 104, which extends horizontally in the context of FIG. 8, and the gate electrode 102 and the gate line 104 are made of a conducting material. The gate electrode 102 and the gate line 104 may be formed in a single layer including a metal such as aluminum (Al), an alloy of aluminum and neodymium (AlNd), tungsten (W), chromium (Cr), and molybdenum (Mo). Also, the gate electrode 102 and the gate line 104 may be formed in a double layer of aluminum (Al) and chromium (Cr), or aluminum (Al) and molybdenum (Mo) so as to supplement the aluminum (Al), which has a low resistivity but is sensitive to chemicals. The gate insulator 106 may be made of silicon nitride (SiNx) or silicon oxide (SiO$_2$) or the like. The active layer 108 and the doped semiconductor layer 110a are formed of amorphous silicon and doped amorphous silicon, respectively.

Figure 9B:
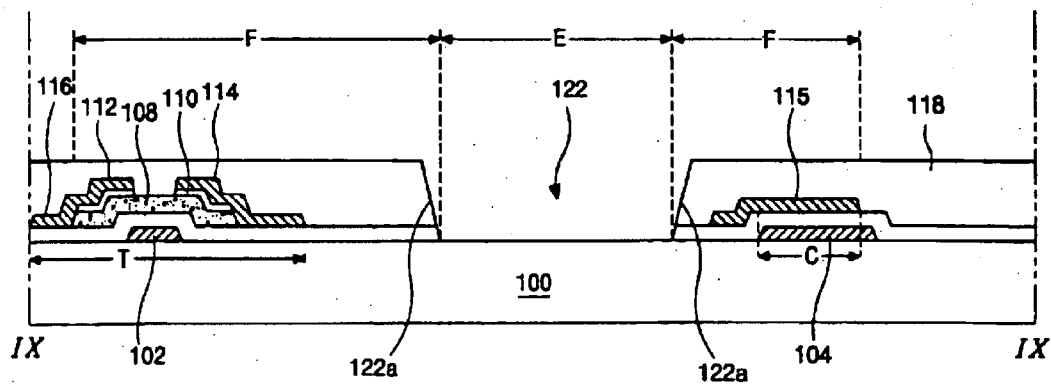

In FIG. 9B, a data line 116, a source electrode 112 and a drain electrode 114 are formed on the doped semiconductor layer 110a of FIG. 9A. A capacitor electrode 115 of the same material as the data line 116 is also formed on the gate insulator 106. Then, the doped semiconductor layer 110a of FIG. 9A, which is exposed between the source electrode 112 and the drain electrode 114, is etched and an ohmic contact layer 110 is completed. Next, a first passivation layer 118 is formed on the data line 116, the source and drain electrodes 112 and 114, and the capacitor electrode 115. The first passivation layer 118 is patterned, so that a first transmissive hole 122, which exposes a part of the substrate 100 through the gate insulator 106, is formed. The gate insulator 106 may be not etched. The first transmissive hole 122 corresponds to a transmissive region "E" and has an inclined portion 122a which surrounds the first transmissive hole 122. The first transmissive hole 122 causes a thickness of a liquid crystal layer (not shown) in the transmissive region "E" to be thicker than that of a liquid crystal layer in a reflective region "F", and optimizes the optical characteristic of a transmissive mode with the optical characteristic of a reflective mode. The source electrode 112 is connected to the data line 116, which extends vertically in the context of FIG. 8 and crosses the gate line 104 to define a pixel region "P" of FIG. 8. The capacitor electrode 115 overlaps a part of the gate line 104 to form a storage capacitor "C". Here, the gate electrode 102, the source electrode 112 and the drain electrode 114 form a thin film transistor "T".

The data line 116, the source and drain electrodes 112 and 114, and the capacitor electrode 115 are made of a metal material such as chromium (Cr), molybdenum (Mo), titanium (Ti), tungsten (W), antimony (Sb), aluminum (Al), and aluminum alloy such as aluminum-neodymium (AlNd). The source electrode 112, the drain electrode 114, the data line 116 and the capacitor electrode 115 may be made of the same material as the gate electrode 102.

The first passivation layer 118 is made of an organic material such as benzocyclobutene (BCB) or acrylic resin. The first passivation layer 118 flattens the surface of the substrate 100 having the thin film transistor "T". The first passivation layer 118 has a thickness of about 2 to about 3μm.

Figure 9C:
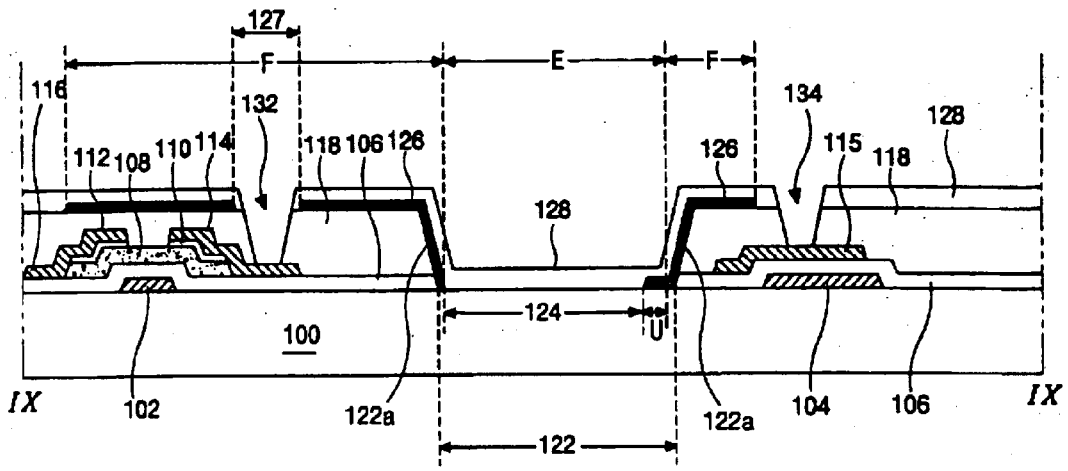

Next, in FIG. 9C, a reflector 126 is formed on the first passivation layer 118. The reflector 126 has an opening 127 over the drain electrode 114, wherein the opening 127 prevents the reflector 126 from contacting a transparent electrode to be formed later. The reflector 126 also has a second transmissive hole 124 corresponding to the first transmissive hole 122. Subsequently, a second passivation layer 128 is formed on the reflector 126 and patterned, so that a drain contact hole 132 and a capacitor contact hole 134 are formed through the first passivation layer 118. The drain contact hole 132 and the capacitor contact hole 134 expose the drain electrode 114 and the capacitor electrode 115, respectively.

The reflector 126 covers the inclined portion 122a and is formed in a region "U" inside of the transmissive region "E", wherein the region "U" corresponds to the upper and left sides of the transmissive region "E" in the context of FIG. 8. The asymmetric location of the reflector on the sides of the transmissive region is determined by the alignment direction.

The reflector 126 is made of a metal that reflects light well, such as aluminum (Al). The reflector 126 may be formed of either aluminum (Al) or an alloy of aluminum and neodymium (AlNd). Here, the reflector 126 may cover the thin film transistor "T" to prevent light from leaking into a channel of the thin film transistor "T".

The second passivation layer 128 is made of an inorganic material such as silicon nitride (SiN$_x$) and silicon oxide (SiO$_x$).

Figure 9D:
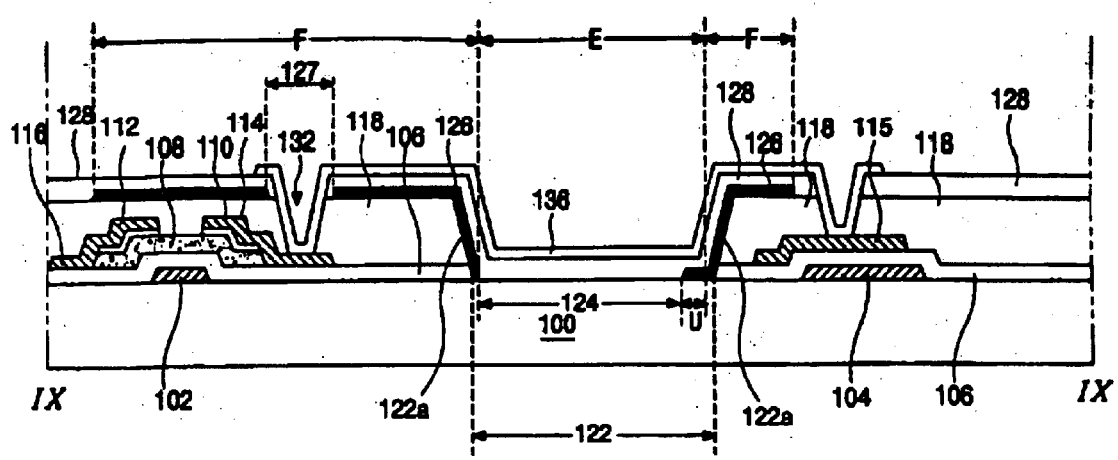

In FIG. 9D, a transparent electrode 136 is formed on the second passivation layer 128. The transparent electrode 136 is connected to the drain electrode 114 and the capacitor electrode 115 through the drain and capacitor contact holes 132 and 134, respectively. The transparent electrode 136 may be made of a transparent conducting material such as indium-tin-oxide (ITO) and indium-zinc-oxide (IZO).

Though not shown in the figure, an alignment layer is formed on the transparent electrode 136 and is arranged in the alignment direction "G2" of FIG. 8 by a rubbing method. The alignment direction "G2" has an angle of about −45 degrees with respect to the gate line 104.

Figure 10A:
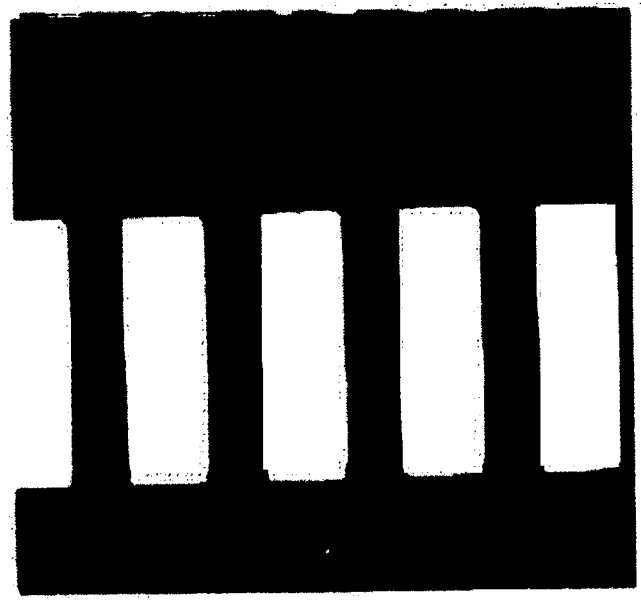
FIGS. 10A and 10B are views showing driving results of a transmissive mode in a transflective liquid crystal display (LCD) device having the first embodiment array substrate.
Figure 10B:
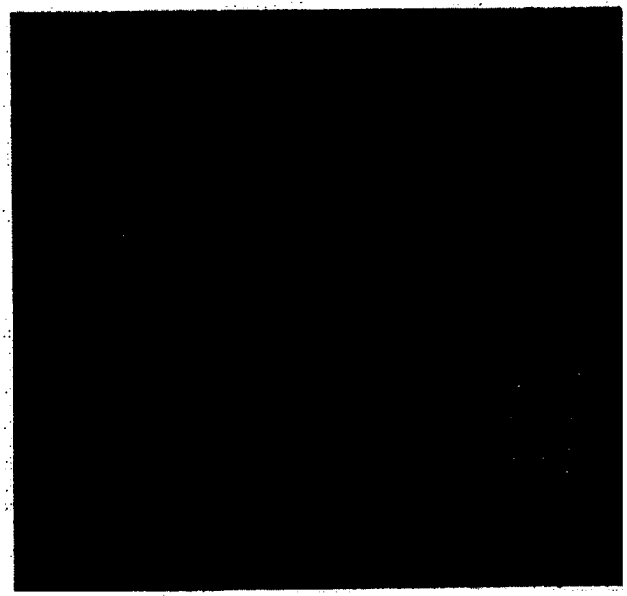
Figure 11A:
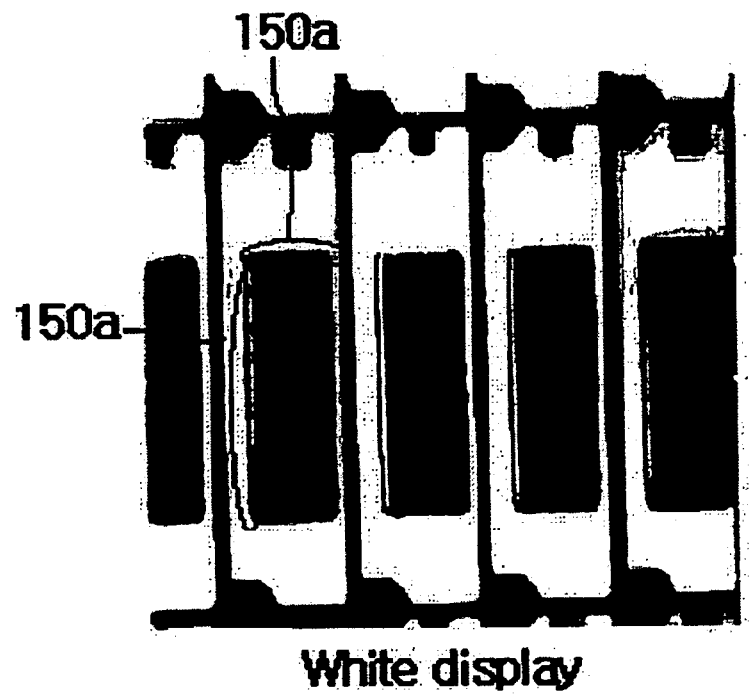
FIGS. 11A and 11B are views showing driving results of a reflective mode in a transflective liquid crystal display (LCD) device having the first embodiment array substrate.
Figure 11B:
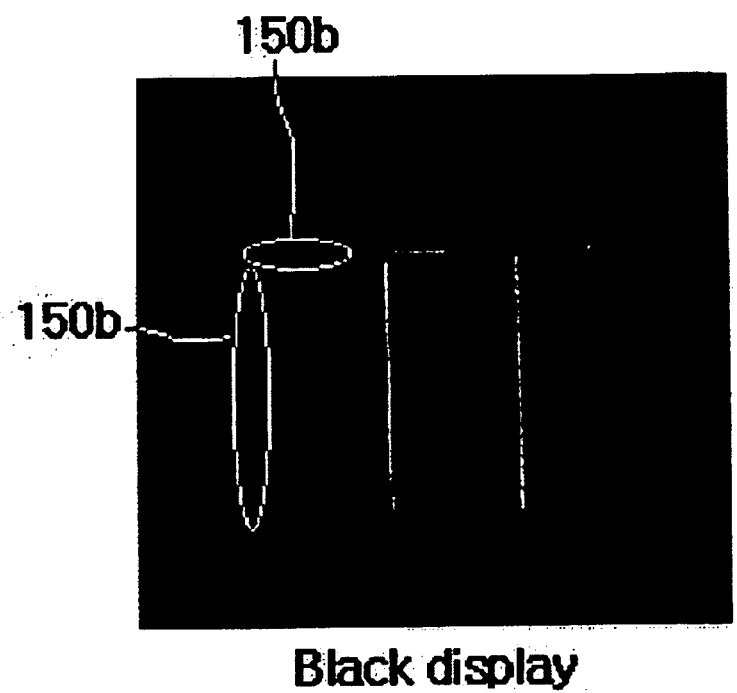

FIGS. 10A and 10B and FIGS. 11A and 11B show the driving results of the transflective LCD device having the first embodiment array substrate. FIGS. 10A and 10B are the results of a transmissive mode, and show white and black displays, respectively. FIGS. 11A and 11B are the results of a reflective mode, and show white and black displays, respectively.

As shown in FIGS. 10A and 10B, light leakage does not occur in both the white and black displays because the reflector 126 blocks the region "U" of FIG. 8, where the light leakage occurs. Accordingly, the contrast ratio of the transmissive mode is improved.

On the other hand, in FIGS. 11A and 11B, though light leakages 150a and 150b (circled) are observed in a region corresponding to "U" of FIG. 8, the light leakages 150a and 150b do not greatly influence the contrast ratio. However, it is desirable that the size of the reflector is small in order to minimize the reduction of the contrast ratio.

In the first embodiment, though the alignment direction "G2" of FIG. 8 is about −45 degrees with respect to the gate line 104, the alignment direction may be about 135 degrees with respect to the gate line 104. That is, the alignment direction of the first embodiment may be in an opposite direction of the alignment direction "G2" of FIG. 8. At this time, the transmissive region to be covered by the reflector should be located to the right and lower sides inside of the transmissive region "E" in the context of FIG. 8. The asymmetric location of the reflector on the sides of the transmissive region is determined by the alignment direction.

Figure 12:
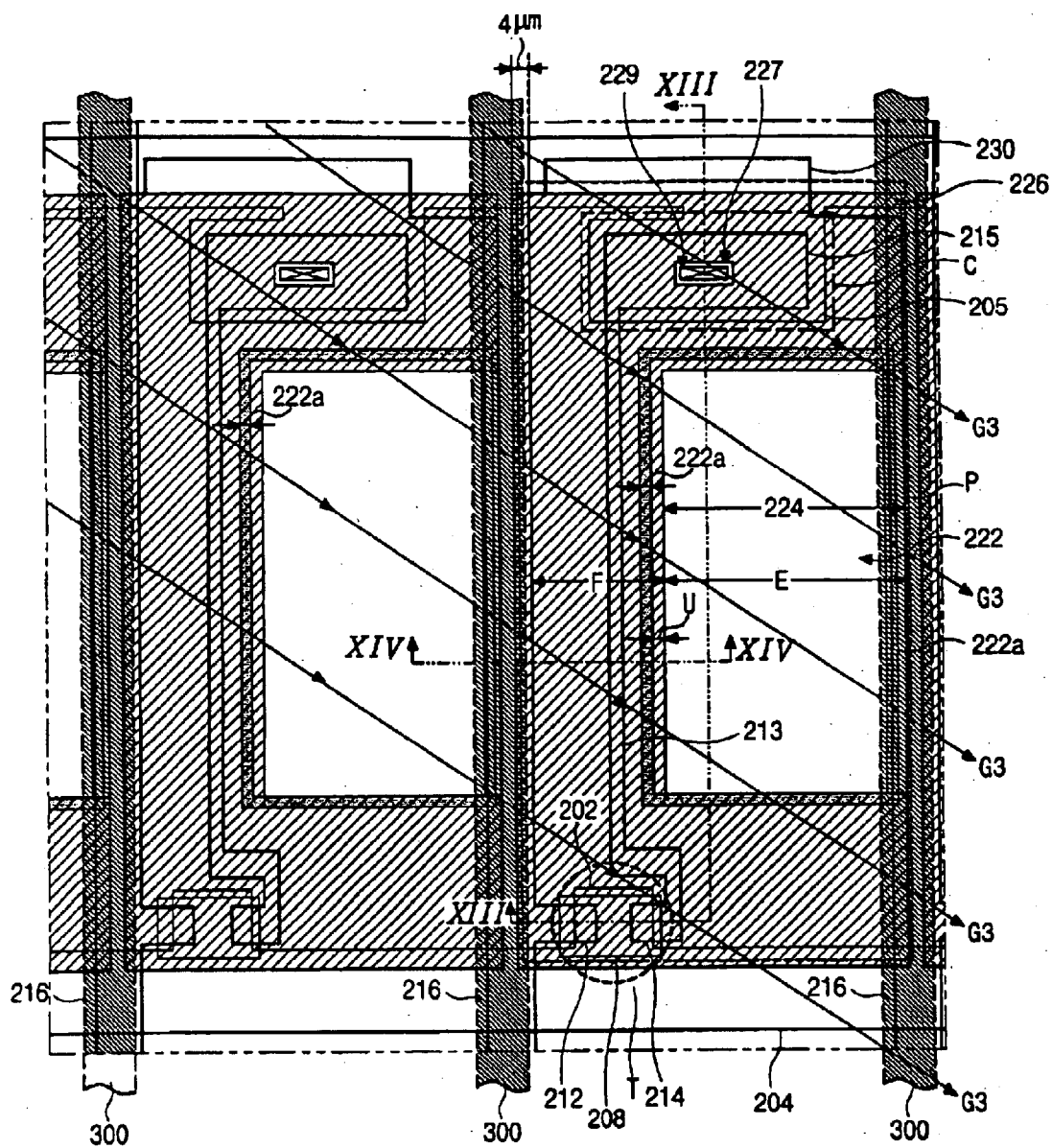
FIG. 12 is a plan view of an array substrate for a transflective liquid crystal display (LCD) device according to a second embodiment of the present invention.

FIG. 12 shows a plan view of an array substrate for a transflective liquid crystal display (LCD) device according to a second embodiment of the present invention.

As shown in FIG. 12, a gate line 204 is formed horizontally in the context of the figure and a gate electrode 202 is connected to the gate line 204. A first capacitor electrode 205 is also formed and is connected to the gate line 204. A data line 216 is formed vertically in the context of the figure and a source electrode 212 and a drain electrode 214 are formed. The gate and data lines 204 and 216 cross each other and define a pixel region "P". A second capacitor electrode 215, which is connected to the drain electrode 214 through a connecting part 213 formed in the pixel region "P", is formed and overlaps the first capacitor electrode 205. The first and second capacitor electrodes 205 and 215 form a storage capacitor "C". The source electrode 212 is connected to the data line 216. The gate electrode 204, the source electrode 212 and the drain electrode 214 form a thin film transistor "T". The thin film transistor "T" includes an active layer 208.

The pixel region "P" is divided into a transmissive region "E" and a reflective region "F". In the pixel region "P", a reflector 226 and a transparent electrode 230 are formed overlapping both sides of the data line 216 by about 4μm each. Meanwhile, a passivation layer (not shown), which may be referred to as a first passivation layer later, is formed under the reflector 226 and the transparent electrode 230. The passivation layer has a first transmissive hole 222 corresponding to the transmissive region "E". An inclined portion 222a is formed around the first transmissive hole 222. The reflector 226 also has a second transmissive hole 224 corresponding to the first transmissive hole 222. Here, the right side of the second transmissive hole 224 overlaps the right side of the transparent electrode 230 in the context of the figure. The reflector 226 covers the inclined portion 222a except for the right side of the inclined portion in the figure 222a and is formed in a region "U" inside of the transmissive region "E", wherein the region "U" corresponds to the upper and left sides of the transmissive region "E" in the context of the figure. The asymmetric location of the reflector on the sides of the transmissive region is determined by the alignment direction.

The transparent electrode 230 is a pixel electrode of driving liquid crystal molecules. The transparent electrode 230 is connected to the second capacitor electrode 215 through a capacitor contact hole 229, so that the transparent electrode 230 is electrically connected to the drain electrode 214 through the connecting part 213, which is located under the reflector 226.

In FIG. 12, a symbol "300" indicates a black matrix, which is formed on another substrate (not shown) over the array substrate. The black matrix 300 corresponds to the data line 216 and covers both the right side of the inclined portion 222a of a left pixel centered from the data line 216 and the left side of the reflective region "F" of a right pixel centered from the data line 216 in the context of the figure. A center line of a width of the black matrix 300 does not coincide a center line of the data line 216.

Here, an alignment direction "G3" of an alignment layer (not shown) to be formed on the top of the array substrate is about −45 degrees with respect to the gate line 204.

The array substrate of FIG. 12 is used for a transflective LCD device having a fine pixel pitch. In the array substrate, light leakage occurs in the area all around the transmissive region "E" due to the fine pixel pitch. In the second embodiment, in the context of the figures, since the region "U", i.e. the upper and left sides of the transmissive region "E" of the left pixel centered from the data line 216, is covered with the reflector 226 and the right side of the inclined portion 222a of the left pixel centered from the data line 216 and the left side of the reflective region "F" of the right pixel centered from the data line 216 are covered with the black matrix 300, the light leakage is blocked.

On the other hand, in the array substrate, a drain contact hole is omitted, so that the aperture ratio increases more.

FIGS. 13A to 13D and FIGS. 14A to 14D illustrate a method of manufacturing an array substrate for a transflective liquid crystal display (LCD) device according to the second embodiment of the present invention. FIGS. 13A to 13D correspond to cross-sections along the line XIII—XIII of FIG. 12 and FIGS. 14A to 14D correspond to cross-sections along the line XIV—XIV of FIG. 12.

Figure 13A:
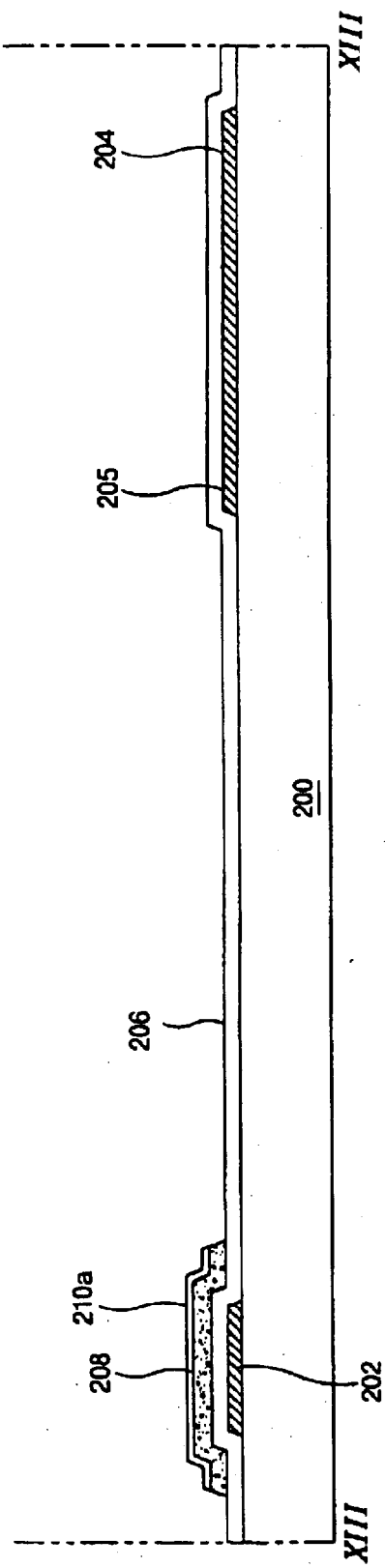
FIGS. 13A to 13D and FIGS. 14A to 14D are cross-sectional views illustrating a method of manufacturing an array substrate for a transflective liquid crystal display (LCD) device according to the second embodiment of the present invention.
Figure 14A:
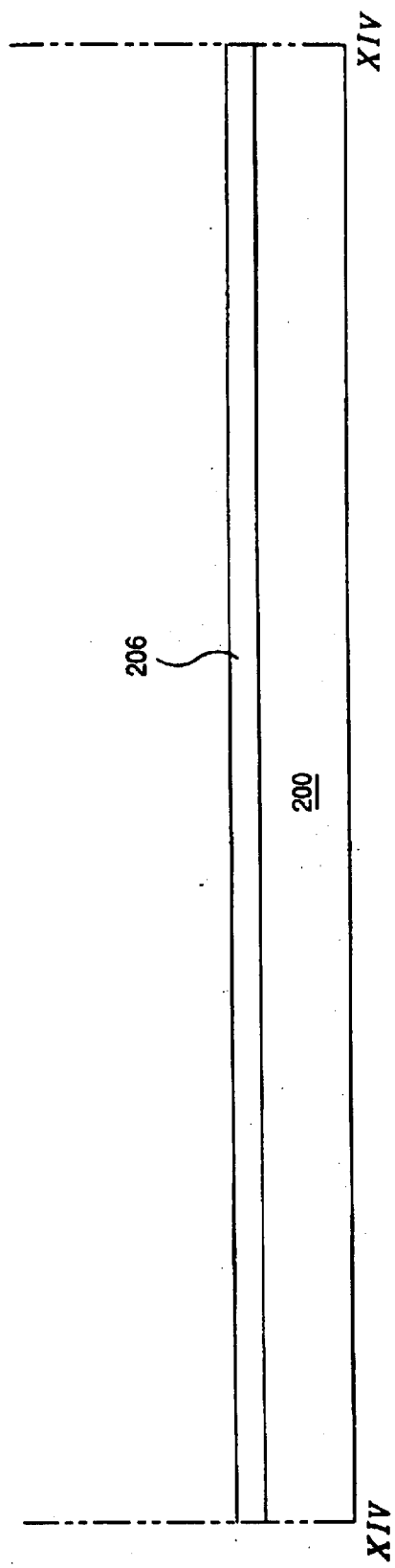

First, in FIGS. 13A and 14A, a gate electrode 202, a gate line 204 and a first capacitor electrode 205 are formed on a substrate 200, and a gate insulator 206 is formed on the gate electrode 202, the gate line 204 and the first capacitor electrode 205. Next, an active layer 208 and a doped semiconductor layer 210a are formed on the gate insulator 206 in order. The substrate 200 is made of an insulating material such as glass. The gate electrode 202 is connected to the gate line 204, which extends horizontally in the context of FIG. 12, and the gate electrode 202, the gate line 204 and the first capacitor electrode 205 are made of a conducting material. The gate electrode 202, the gate line 204 and the first capacitor electrode 205 may be formed in a single layer including a metal such as aluminum (Al), an alloy of aluminum and neodymium (AlNd), tungsten (W), chromium (Cr), and molybdenum (Mo). Also the gate electrode 202, the gate line 204 and the first capacitor electrode 205 may be formed in a double layer of aluminum (Al) and chromium (Cr), or aluminum (Al) and molybdenum (Mo) so as to supplement the aluminum (Al), which has a low resistivity but is sensitive to chemicals. The gate insulator 206 may be made of silicon nitride (SiNx) or silicon oxide (SiO$_x$) or the like. The active layer 208 and the doped semiconductor layer 210a are formed of amorphous silicon and doped amorphous silicon, respectively.

Figure 13B:
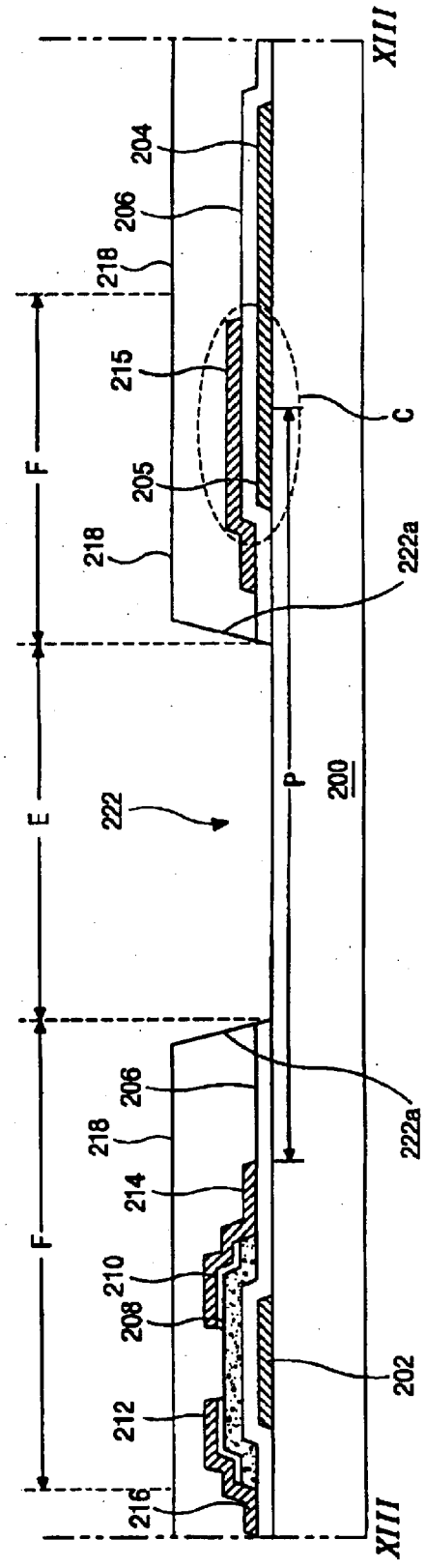
Figure 14B:
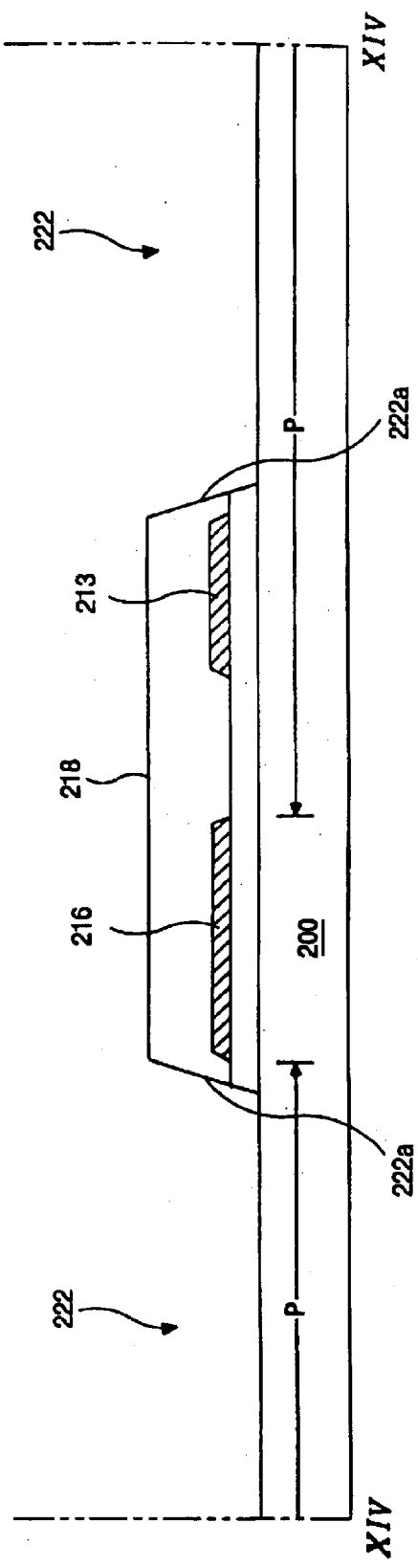

In FIGS. 13B and 14B, a data line 216, a source electrode 212 and a drain electrode 214 are formed on the doped semiconductor layer 210a of FIG. 13A. A second capacitor electrode 215 and a connecting part 213 of the same material as the source electrode 212 and the drain electrode 214 are formed on the gate insulator 206. The second capacitor electrode 215 is connected to the drain electrode 214 through the connecting part 213. Then, the doped semiconductor layer 210a of FIG. 13A, which is exposed between the source electrode 212 and the drain electrode 214, is etched and an ohmic contact layer 210 is completed. Next, a first passivation layer 218 is formed on the data line 216, the source and drain electrodes 212 and 214, the second capacitor electrode 215, and the connecting part 213. The first passivation layer 218 is patterned, so that a first transmissive hole 222, which exposes a part of the substrate 200 through the gate insulator 206, is formed. The gate insulator 206 may not be etched. The first transmissive hole 222 corresponds to a transmissive region "E" and has an inclined portion 222a which surrounds the first transmissive hole 222. The first transmissive hole 222 causes a thickness of a liquid crystal layer (not shown) in the transmissive region "E" to be thicker than that of a liquid crystal layer in a reflective region "F", and optimizes the optical characteristic of a transmissive mode simultaneously with the optical characteristic of a reflective mode.

The source electrode 212 is connected to the data line 216, which extends vertically in the context of FIG. 12 and crosses the gate line 204 to define a pixel region "P" of FIG. 12. The second capacitor electrode 215 overlaps the first capacitor electrode 205 to form a storage capacitor "C". Here, a thin film transistor "T" includes the gate electrode 202, the source electrode 212 and the drain electrode 214.

The data line 216, the source and drain electrodes 212 and 214, the second capacitor electrode 215, and the connecting part 213 are made of a metal material such as chromium (Cr), molybdenum (Mo), titanium (Ti), tungsten (W), antimony (Sb), aluminum (Al), and aluminum alloy such as aluminum-neodymium (AlNd). The source electrode 212, the drain electrode 214, the data line 216, the second capacitor electrode 215 and the connecting part 213 may be made of the same material as the gate electrode 202.

The first passivation layer 218 is made of an organic material such as benzocyclobutene (BCB) or acrylic resin. The first passivation layer 218 flattens the surface of the substrate 200 having the thin film transistor "T". The first passivation layer 218 has a thickness of about 2 to about 3 $\mu$m.

Figure 13C:
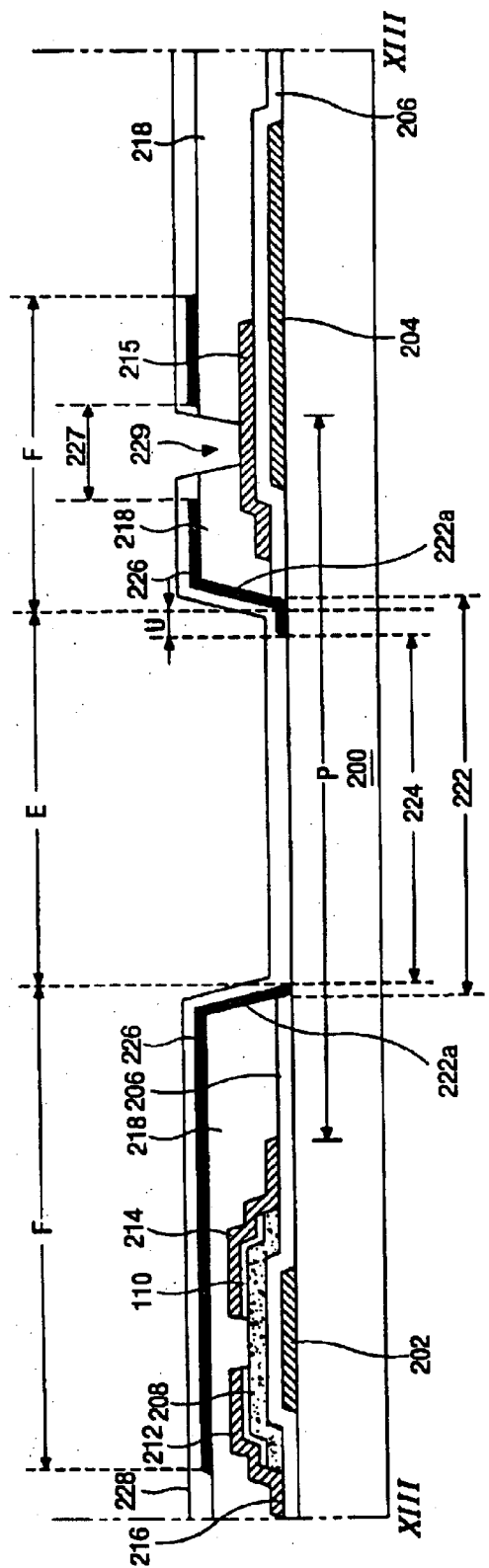
Figure 14C:
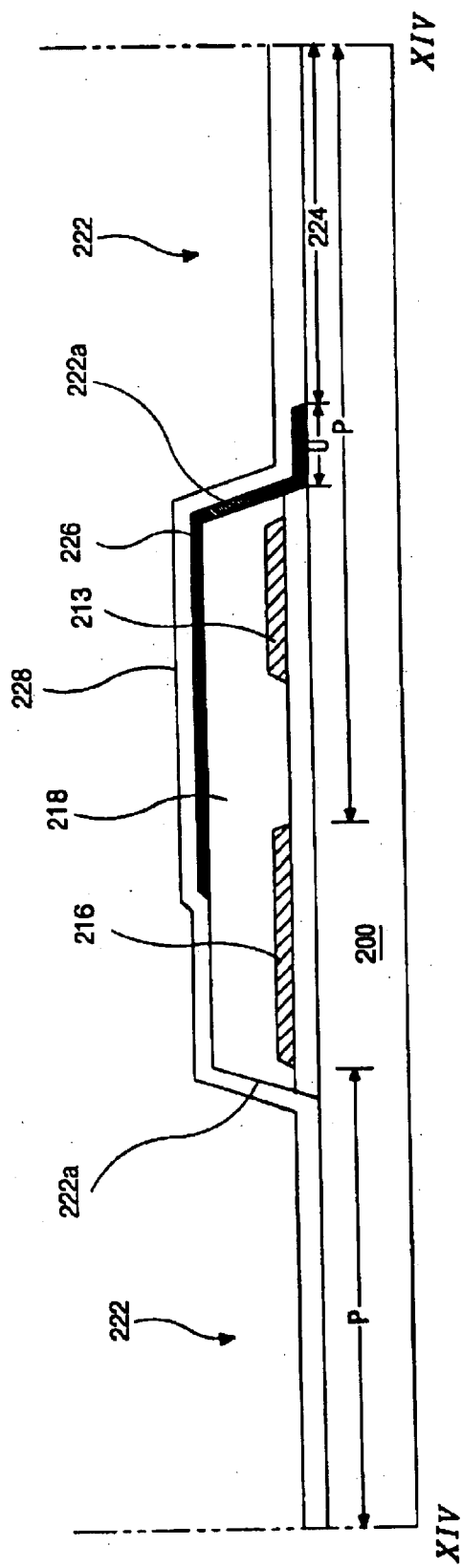

Next, in FIGS. 13C and 14C, a reflector 226 is formed on the first passivation layer 218. The reflector 226 has an opening 227 over the second capacitor electrode 215 connected to the drain electrode 214, wherein the opening 227 prevents the reflector 226 from contacting a transparent electrode to be formed later. The reflector 226 also has a second transmissive hole 224 corresponding to the first transmissive hole 222. Subsequently, a second passivation layer 228 is formed on the reflector 226 and patterned, so that a capacitor contact hole 229 is formed through the first passivation layer 218. The capacitor contact hole 229 exposes the second capacitor electrode 215.

The reflector 226 covers the inclined portion 222a, except for the left side of the data line 216 in the context of FIG. 14C corresponding to the right side of the inclined portion 222a of the left pixel centered from the data line 216 in the context of FIG. 12, and is formed in a region "U" inside of the transmissive region "E", wherein the region "U" corresponds to the upper and left sides of the transmissive region "E" in the context of FIG. 12. The asymmetric location of the reflector on the sides of the transmissive region is determined by the alignment direction.

The reflector 226 is made of a metal that reflects light well, such as aluminum (Al). The reflector 226 may be formed of either aluminum (Al) or an alloy of aluminum and neodymium (AlNd). Here, the reflector 226 may cover the thin film transistor "T" to prevent light from leaking into a channel of the thin film transistor "T".

The second passivation layer 228 is made of an inorganic material such as silicon nitride (SiNx) and silicon oxide (SiO$_x$).

Figure 13D:
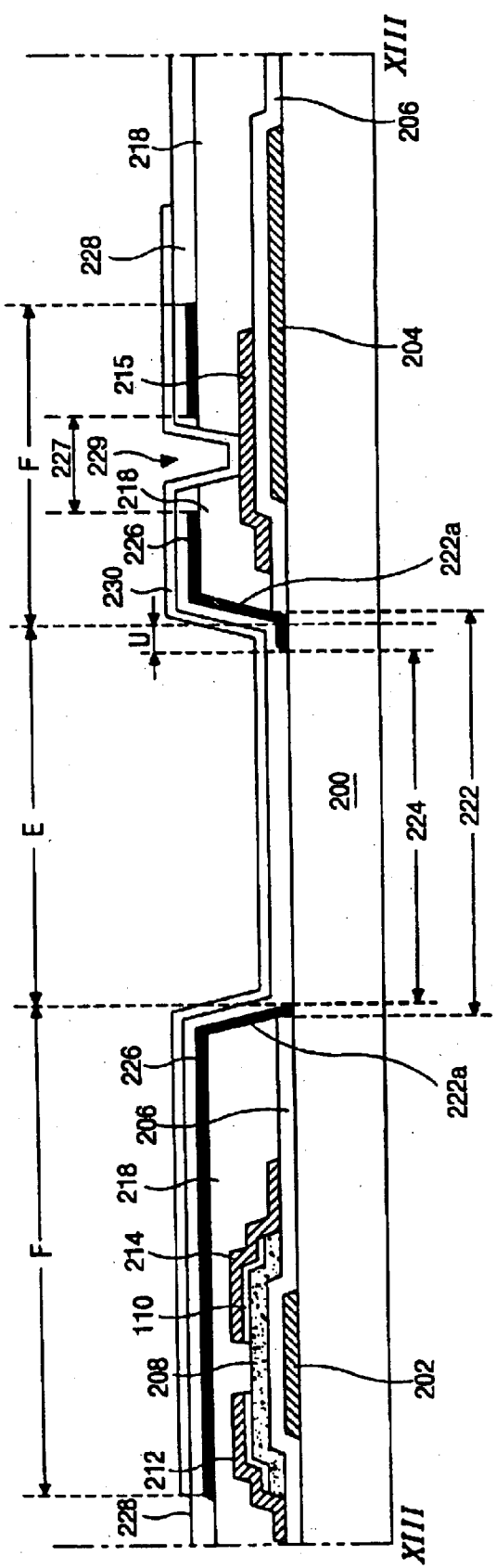
Figure 14D:
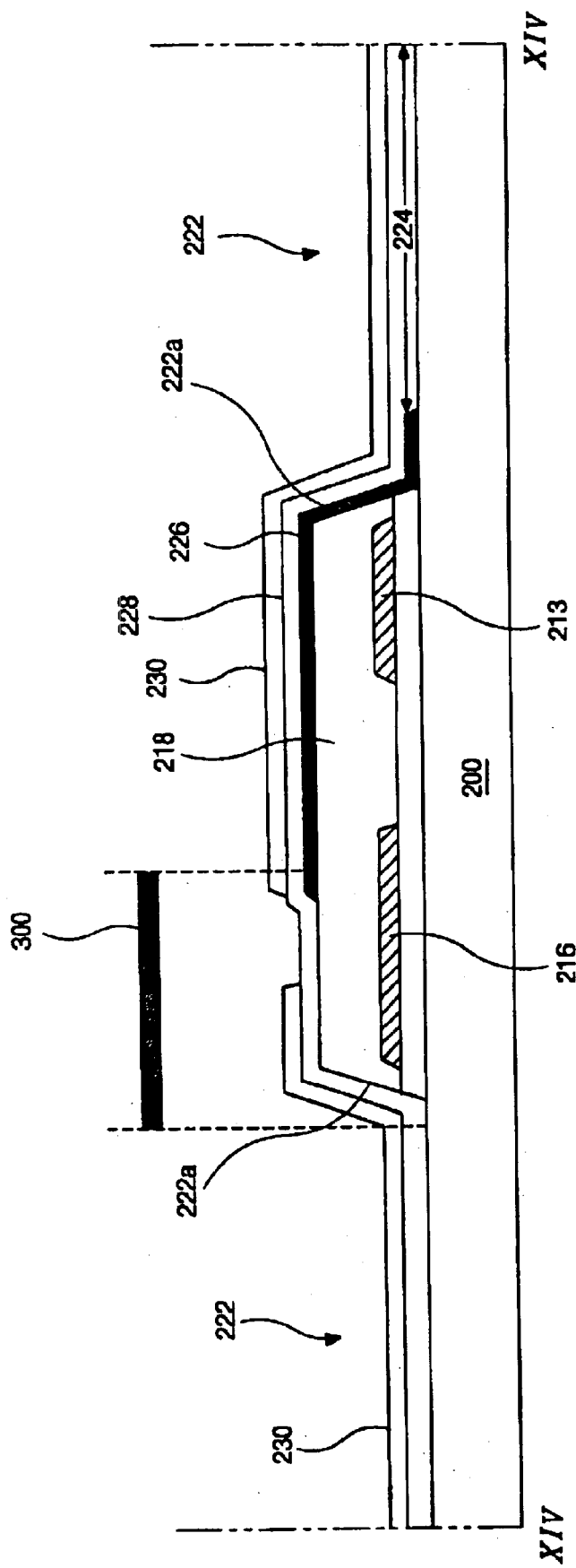

In FIGS. 13D and 14D, a transparent electrode 230 is formed on the second passivation layer 228. The transparent electrode 230 is connected to the second capacitor electrode 215 through the capacitor contact hole 229. As stated above, the second capacitor electrode 215 is connected to the drain electrode 214 and the transparent electrode 230 is electrically connected to the drain electrode 214. The right side of the transparent electrode 230 overlaps the right side of the inclined portion 222a in the context of the figures. The transparent electrode 230 may be made of a transparent conducting material such as indium-tin-oxide (ITO) and indium-zinc-oxide (IZO).

Though not shown in the figure, an alignment layer is formed on the transparent electrode 230 and may be arranged by a rubbing method in a direction "G3" of FIG. 12. The alignment direction "G3" has an angle of about −45 degrees with respect to the gate line 204.

On the other hand, a black matrix 300, which is formed on the inner surface of another substrate (not shown) over the substrate 200, is disposed over the data line 216 and covers the transparent electrode 230 and the left side of the inclined portion 222a in the context of FIG. 14D in the left pixel region centered from the data line 216, where light leakage occurs. The reflector 226 and transparent electrode 230 located also overlap the data line 216. The black matrix 300 of the upper substrate (not shown) should be aligned in such a way that the black matrix 300 is shifted in the left direction with respect to the data line 216 in the context of the figure. Since the reflector 226 covers the inclined portion 222a except for the left side in the context of FIG. 14D and is formed in a region "U" inside of the transmissive region "E", when voltage is applied to the transflective LCD device, distortion from a fringe field can be prevented. Also, a phase difference of the liquid crystal layer can be prevented from varying in the region to minimize light leakage. Therefore, an array substrate is provided for a transflective liquid crystal display (LCD) device that has high aperture ratio and high resolution and in which no light leakage occurs.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device, comprising:
   a first substrate;
   a gate line and a data line on the first substrate, the gate and data lines crossing each other to define a pixel region, the pixel region having a transmissive region and a reflective region;
   a thin film transistor electrically connected to the gate and data lines;
   a first passivation layer covering the thin film transistor, the first passivation layer having a first transmissive hole corresponding to the transmissive region and an inclined portion surrounding the first transmissive hole;
   a reflector corresponding to the reflective region on the first passivation layer, the reflector covering sides of the transmissive region asymmetrically;
   a second passivation layer on the reflector; and
   a transparent electrode on the second passivation layer, the transparent electrode electrically contacting the thin film transistor.

2. The device according to claim 1, further comprising an alignment layer on the transparent electrode, wherein the reflector covering sides of the transmissive region asymmetrically is determined by an alignment direction of the alignment layer.

3. The device according to claim 2, wherein the alignment direction has an angle of about −45 degrees with respect to the gate line.

4. The device according to claim 1, wherein the reflector has a second transmissive hole in the pixel region, the second transmissive hole corresponding to the first transmissive hole.

5. The device according to claim 1, further comprising a black matrix on an inner surface of a second substrate spaced apart over the first substrate, wherein the black matrix overlaps the data line and covers at least a side of the inclined portion.

6. The device according to claim 5, wherein the reflector is disposed over other sides of the inclined portion except for the covered side.

7. The device according to claim 5, wherein a center line of a width of the black matrix does not coincide a center line of the data line.

8. The device according to claim 1, wherein the first passivation layer includes one of benzocyclobutene (BCB) and photosensitive acrylic resin.

9. The device according to claim 8, wherein the second passivation layer includes one of silicon nitride and silicon oxide.

10. The device according to claim 1, wherein the reflector covers the thin film transistor.

11. The device according to claim 1, further comprising a first capacitor electrode, wherein the first capacitor electrode is electrically connected to the transparent electrode.

12. The device according to claim 11, further comprising a second capacitor electrode connected to the gate line.

13. The device according to claim 12, wherein the first capacitor electrode overlaps the second capacitor electrode.

14. The device according to claim 13, wherein the first and second capacitor electrodes are disposed in the reflective region.

15. The device according to claim 14, wherein the first capacitor electrode is directly connected to the drain electrode.

16. The device according to claim 1, wherein the reflector is connected to the transparent electrode.

17. A method of manufacturing a transflective liquid crystal display device, comprising:
   forming a gate line on a first substrate;
   forming a data line crossing the gate line, the data line and the gate line defining a pixel region, the pixel region having a transmissive region and a reflective region;
   forming a thin film transistor electrically connected to the gate and the data lines;
   forming a first passivation layer on the thin film transistor, the first passivation layer having a first transmissive hole corresponding to the transmissive region and an inclined portion surrounding the first transmissive hole;
   forming a reflector corresponding to the reflective region on the first passivation layer, the reflector covering sides of the transmissive region asymmetrically;
   forming a second passivation layer on the reflector; and
   forming a transparent electrode on the second passivation layer, the transparent electrode electrically contacting the thin film transistor.

18. The method according to claim 17, further comprising forming an alignment layer on the transparent electrode and aligning a surface of the alignment layer along an alignment direction, wherein the reflector covering sides of the transmissive region asymmetrically is determined by the alignment direction.

19. The method according to claim 18, wherein the alignment direction has an angle of about −45 degrees with respect to the gate line.

20. The method according to claim 17, wherein the reflector has a second transmissive hole in the pixel region, the second transmissive hole corresponding to the first transmissive hole.

21. The method according to claim 17, further comprising forming a black matrix on an inner surface of a second substrate spaced apart over the first substrate, wherein the black matrix overlaps a part of the data line and covers at least a side of the inclined portion.

22. The method according to claim 21, wherein the reflector is disposed over other sides of the inclined portion except for the covered side.

23. The device according to claim 21, wherein a center line of a width of the black matrix does not coincide a center line of the data line.

24. The method according to claim 17, wherein the first passivation layer includes one of benzocyclobutene (BCB) and photosensitive acrylic resin.

25. The method according to claim 24, wherein the second passivation layer includes one of silicon nitride and silicon oxide.

* * * * *